United States Patent Office 3,576,806
Patented Apr. 27, 1971

3,576,806
STABILIZATION AND PURIFICATION OF AZIRIDINES DERIVED FROM ACTIVE HALOGEN COMPOUNDS
Joseph Adrian Hoffman, Bound Brook, N.J., assignor to American Cyanamid Company, Stamford, Conn.
No Drawing. Filed Aug. 8, 1969, Ser. No. 848,741
Int. Cl. C07d 55/22
U.S. Cl. 260—249.6                10 Claims

ABSTRACT OF THE DISCLOSURE

Process for improving the storage stability of 2,4,6-tris(aziridinyl)-s-triazines which comprises reacting the triazine product with a halogen scavenger to reduce the concentration of halogen containing impurities, now identified as the cause of instability in such triazines.

This invention relates to a new method for improving the storage stability of normally unstable polyfunctional aziridinyl compounds. More particularly, it relates to an improved process for the stabilization of 2,4,6-tris-(aziridinyl) - s - triazines whereby they are capable of being stored for extended periods without losses due to unwanted self-polymerization.

Compounds represented by the structural Formula I:

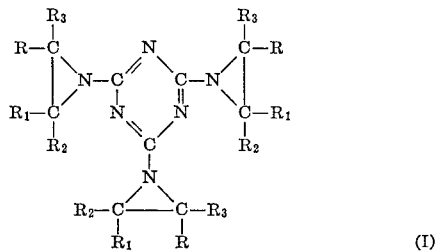

(I)

wherein each of the R, $R_1$, $R_2$ and $R_3$ radicals is hydrogen or alkyl of 1–6 carbons may be prepared by the reaction of three moles of an aziridine with one mole of a cyanuric halide, e.g., cyanuric chloride, in the presence of a suitable solvent and an acid binding agent. The temperature of the reaction is generally maintained below 50° C., and preferably below 30° C., in order to minimize self-polymerization of the product through the very reactive aziridinyl radicals. The reaction mixture, containing the triazine of Formula I and salts resulting from the reaction of the chloride ions and the acid binder, is then generally extracted several times with water to remove salts, filtered to remove other solids, dried to remove water from the solvent, and then distilled to remove the solvent. The product is normally stored under refrigeration in containers which are closed in order to obtain maximum storage stability.

The triazine compounds of Formula I have heretofore exhibited poor storage stability whether stored at room temperature or under refrigeration. In a typical case, 2,4,6-tris[1-(2-ethyl)aziridinyl] - s - triazine, only 62% of the original aziridinyl content of the sample remained after storage for 30 days at room temperature. Due to the physical and chemical properties of these compounds, prior efforts to improve the storage stability thereof generally have not been successful. Attempts to purify the compounds by recrystallization, though effective with related compounds such as 2,4,6-tris(aziridinyl)-s-triazine and 2,4,6-tris[1 - (2 - methyl)aziridinyl] - s-triazine, have been unsuccessful with the compound of Formula I wherein each R is ethyl and $R_1$, $R_2$ and $R_3$ are hydrogen which is quite soluble in almost all of the common organic solvents, even at low temperatures. Purification by fractional distillation and related methods are impractical because of the tendency of the compounds to polymerize upon heating even at moderate temperatures. Purification by chemical means is impractical because of the high reactivity of the aziridinyl groups and the difficulties of converting the compounds to their original form.

There exists, therefore, the need for an improved means for the preparation of 2,4,6-tris-(aziridinyl)-s-triazines of improved storage stability, which means is convenient and economical to perform, does not result in high losses of the desired compounds and does not interfere with desired reactivity of the compounds. Accordingly, it is a principle object of this invention to provide means for obtaining such storage stable products. Other objects will become apparent from the ensuing description of the invention.

It has now been found that the cause of instability of the aforedescribed aziridine products is the presence of halogen containing impurities in the product. Furthermore, halogen content surprisingly is not obviated merely by using excess acid binder in the preparative reaction. Only when the aziridine reaction product is treated by the methods described hereinbelow, is the halogen content rendered sufficiently low to give a polyfunctional aziridine exhibiting improved storage stability.

Thus, in accordance with this invention it has been discovered that 2,4,6 - tris - (aziridinyl)-s-triazines of greatly improved storage stability can be obtained by contacting said product with a halogen scavenger under conditions described hereinbelow. Thus the reaction mixture, either immediately after the reaction is complete or after the triazine has been isolated and dissolvd in an organic solvent, is treated with a halogen scavenger. This result is surprising since an acid binder is normally employed in the preparative reaction, generally in excess of that required to neutralize all of the hydrogen halide that can form during reaction, and still a compound of good stability is not produced. It has been found that by employing the improved purification processes of the present invention, a solution of the stabilized compound is obtained which can be refluxed for several hours without appreciable polymerization. This is advantageous compared with unstabilized products which require low temperatures to avoid polymerization.

According to the present invention, a polyaziridinyl triazine, such as 2,4,6-tris[1-(2-ethyl)aziridinyl] - s - triazine, is prepared by conventional procedures, i.e., by the reaction of three moles of an aziridine, e.g., 2-ethylaziridine, with one mole of cyanuric chloride in the presence of an acid binder. In one aspect of the present invention, after the reaction is essentially completed, the compound is treated with a halogen scavenger to form salts which are subsequently removed. These salts can be formed either by refluxing the reaction mixture prior to isolating the compounded or by agitating, at ambient temperatures, a solution of the isolated product with the halogen scavenger. While the treatment with a halogen scavenger is conveniently carried out by refluxing the reaction mixture before any subsequent treatments, such as washing, extraction, filtering, or evaporation of solvent, the alternative procedure at ambient temperatures is effective in improving the storage stability of the compounds. The stabilized product is separated from the formed salts and recovered.

The treatment with a halogen scavenger at ambient temperatures can be carried out after washing, after filtering, or after isolation of the crude polyfunctional aziridine product. When treating the isolated product, the product is dissolved in a solvent. Since the compound has poor storage stability prior to the above treatment, it is preferred to carry out the treatment as soon as possible after the compound has been prepared to minimize compound loss due to said instability.

In another embodiment of the present invention, after the reaction has been completed, the reaction mixture is refluxed in the presence of a halogen scavenger. The reflux temperature will vary depending upon the solvent or mixture of solvents employed in the reaction. Generally, it will range from about 60° to 130° C., with the range of 70° to 100° C. being preferred. The time of refluxing may vary from 1 to 8 hours and preferably is in the range of 2 to 3 hours. The scavenger used in the subsequent treatment may comprise the residual acid binding agent present in the reaction mixture supplemented by additional scavenger, if necessary, or it may be added when the subsequent treatment is to be performed. After refluxing, the reaction mixture is cooled, extracted with water to remove soluble materials which are predominantly salts, filtered to remove solids, dried with desiccant to remove water from the solvent phase containing the desired product, and distilled, generally under vacuum, to remove solvent. The resultant compound has a considerably reduced content of halogen containing impurities as compared to the compound prepared and isolated by conventional methods and thus it has correspondingly increased storage stability.

Alternatively, the halogen scavenger can be added to a solution of the reaction product, after the compound has been subjected to a preliminary purification step to remove halide salts formed during the reaction. The scavenger may be added along with a solvent, if one is desired. Effective treatment with the halogen scavenger proceeds in this method, even at ambient temperatures if the mixture is allowed to stand for a sufficient time with agitation. After standing, the mixture is extracted with water several times to remove soluble materials, mostly salts, filtered to remove solids, dried with desiccant to remove water from the solvent phase, distilled, generally under vacuum, to remove solvent. By "ambient" temperatures is generally meant temperatures ranging from about 15° to 45° C., usually 20° to 30° C. The time of treatment in this alternative procedure may vary from about 1 to about 24 hours or more, depending upon the scavenger employed and the nature and amount of solvent employed, etc. Overnight treatment, i.e., about 18 hours, is generally preferred.

Among the halogen scavengers which can be employed in the subsequent treatment are included agents normally used in the conventional reaction, as acid binders, as well as certain additional agents. These include alkalies, in general, such as sodium hydroxide, sodium carbonate, potassium hydroxide, sodium amide, etc., organic bases such as amines represented by triethylenediamine; quaternary ammonium bases such as choline, etc.; various metal oxides such as calcium oxide, barium oxide, etc.; various silver salts such as silver oxide, silver nitrate, silver acetate, etc.; and various other metal salts such as barium hydroxide, calcium carbonate, etc.; as well as other halogen scavengers as are known. The amount of scavenger present at the commencement of the subsequent purification reaction should be about 1 to 10%, preferably 2.5 to 5.0% based on the calculated weight of the polyfunctional aziridinyl compound.

When refluxing a hydrocarbon solution of the aziridinyl product with an aqueous solution or mixture of scavengers, the presence of a surfactant or wetting agent has been found to be desirable. The amount of surfactant will vary from about 0.1 to 10.0%, preferably 0.25 to 5.0%, based on the weight of aziridinyl compound present, as well as the amount of halogen impurity present in the sample. The reaction and subsequent treatment are effected in the presence of an inert solvent to achieve best results. The solvent employed should be unreactive with the various intermediates and reagents employed and have reasonable solvating action on the components involved. Suitable solvents for the reaction include aromatic hydrocarbons such as benzene, toluene, xylene, alkanes such as hexane, heptane, and the like. These same solvents may be employed in the subsequent treatment step wherein, additionally, other solvents such as water, methanol, etc. may also be employed. The amount of solvent employed is not critical, except that sufficient amounts should be employed to dissolve the aziridinyl compound. It is not necessary for the halogen scavenger to be in solution.

Products obtained by the processes of this invention contain three aziridinyl groups and are reactive with monomeric and polymeric compounds having reactive hydrogens, including alcohols, phenols, mercaptans, thiophenols, carboxylic acids, amines, etc. They are thus useful as crosslinking agents in the preparation of plastics and resins, textiles, varnishes, paper, etc. For example, they are an effective curing agent for vulcanizable rubbery materials which serve as binders in solid rocket propellant compositions. Rubbery materials include homopolymers of conjugated dienes and copolymers of conjugated dienes with materials copolymerizable therewith as shown in U.S. Pat. No. 3,087,843. Of particular interest are their use in propellant compositions comprising an inorganic oxidizing salt and either a synthetic acid-terminated polymeric binder or a synthetic copolymer of a conjugated diene and an unsaturated carboxylic acid as for example as shown by U.S. Pat. No. 3,087,844.

The invention is more fully illustrated by the examples which follow.

The conventional procedure for the preparation of 2,4,6-tris[1-(2-ethyl)aziridinyl]-s-triazine is as follows:

CONTROL

Into a suitably equipped reactor were added 63.3 parts (0.9 mole, a 20% excess) of 2-ethylaziridine and 88.4 parts (0.875 mole, a 10% excess) of triethylamine dissolved in 500 milliliters of benzene. This solution was cooled to 5–10° C. in an ice bath and to it was added 46.1 parts (0.25 mole) of cyanuric chloride dissolved in 250 milliliters of benzene. The rate of addition was controlled so that the reaction temperature was maintained below 30° C. After the addition was complete, the mixture was stirred at 25–30° C. for one hour and then filtered. The filtrate was stripped of solvent under vacuum keeping the temperature below 50° C. There was obtained 2,4,6-tris[1-(2-ethyl)aziridinyl]-s-triazine as a crystalline white solid having a chlorine content of 1.2%.

Example 1

Into a suitably equipped reactor was placed 46.1 parts (0.25 mole) of cyanuric chloride and 500 milliliters of hexane. The mixture was cooled to 0° C. and approximately 1 part of a surfactant (alkyl aryl polyethyleneglycol ether supplied by Jefferson Chemical Co. under the trade name Surfonic N95) was added thereto. To this mixture were simultaneously added, 63.3 parts (0.9 mole, a 20% excess) of 2-ethylaziridine dissolved in 125 milliliters of water and 33 parts of sodium hydroxide (0.825 mole, a 10% excess) dissolved in 125 milliliters of water. The temperature of the reaction was maintained below 15° C. by external cooling and slow addition of the caustic and the 2-ethylaziridine. When the addition was complete and the reaction was essentially complete, the reaction mixture containing the excess sodium hydroxide was heated to reflux and held for about 3 hours. The reaction mixture was then cooled to room temperature and the aqueous layer removed. The organic phase was extracted with water three times, adding sodium chloride as necessary to break any emulsion which formed. The hexane was then distilled from the organic phase under vacuum, maintaining the temperature below 50° C. A yield of 66 parts of a crystalline white product 91.5% of theory, was obtained which contained 0.35% chlorine.

The preparation of Example 1 was repeated except that no surfactant was employed and the refluxing step was omitted. The product which was obtained had a chlorine content of approximately 1.5%.

This example illustrates the low chlorine content of the product obtained by the process of the present invention as contrasted with conventional preparative procedures.

Example 2

To 15 parts of a sample of 2,4,6-tris[1-(2-ethyl)-aziridinyl]-s-triazine prepared according to the procedure of Example 1 but containing 2.1% chlorine was added 85 parts of hexane. To this solution was added 1 part of triethylenediamine. The mixture was allowed to stand overnight during which time a solid precipitate slowly formed. The mixture was then filtered to remove the precipitate and the hexane removed. The crystalline white solid which was recovered had a chlorine content of 0.54%.

Example 3

To 85 parts of hexane was added 15 parts of the product of Example 1. To the solution thus formed at 25° C. was added 0.5 part of silver oxide and 10 parts of methanol. The mixture was stirred for about 2 hours and then allowed to stand overnight. The mixture was then filtered and stripped of solvent. The white crystalline product which was obtained had a chlorine content of 0.16%.

Example 4

The products obtained from the control and Examples 2 and 3 were assayed for initial chlorine content, and for aziridinyl content initially and after standing for various time periods at room temperature. The assay method is described in Anal. Chem. 35, 1063–1064 (1963). Results of the assays are shown in Table I, which follows:

TABLE I.—EFFECT OF RESIDUAL CHLORINE CONTENT ON STORAGE STABILITY OF POLYFUNCTIONAL AZIRIDINYL COMPOUNDS AT ROOM TEMPERATURE

| Product of— | Residual chlorine (percent) | Assay (Percent aziridinyl content) after days of storage | | | | | |
|---|---|---|---|---|---|---|---|
| | | Initial | 10 | 20 | 30 | 40 | 50 |
| Control | 1.2 | 92.7 | 88 | 74 | 58 | | |
| Example 2 | 0.54 | 95.0 | 92.5 | 89.7 | | 85.5 | |
| Example 3 | 0.16 | 93.9 | 93.7 | 92.8 | 92.0 | | 89.5 |

This example shows the beneficial effects in storage stability that are derived from reducing the residual chlorine contents of the polyfunctional aziridinyl compound by the process of the present invention.

What is claimed is:

1. In a process for preparing 2,4,6-tris(aziridinyl)-s-triazines by reaction of a cyanuric halide and an aziridine, the improvement which comprises reacting the triazine product with a halogen scavenger whereby the storage stability of said triazine is substantially increased.

2. Process as defined in claim 1 wherein the halogen scavenger is present in amounts of from about 1 to 10% by weight of the triazine product.

3. Process as defined in claim 1 wherein treatment with halogen scavenger is effected until the halogen content of the product is reduced below about 0.5% of weight.

4. In a process for preparing 2,4,6-tris(aziridinyl)-s-triazines by reaction of a cyanuric halide and an aziridine in the presence of an excess of acid binder, the improvement which comprises heating the resulting triazine product to reflux in the presence of said excess acid binder for a period of from about 1 to about 10 hours whereby said acid binder acts as a halogen scavenger resulting in the increased storage stability of said triazine.

5. Process as defined in claim 4 wherein a surfactant is added to the reaction mixing at least during the reflux period.

6. Process as defined in claim 4 wherein the halogen scavenger is sodium hydroxide.

7. In a process for preparing 2,4,6-tris(aziridinyl)-s-triazine by reaction of a cyanuric halide and an aziridine, the improvement which comprises isolating the crude triazine product, admixing said triazine with an inert solvent, treating said triazine with a halogen scavenger and thereafter recovering the purified product.

8. Process as defined in claim 7 wherein the halogen scavenger is silver oxide.

9. Process as defined in claim 7 wherein the treatment with halogen scavenger is conducted at ambient temperatures.

10. Process as defined in claim 7 wherein the treatment with halogen scavenger is conducted with agitation.

References Cited

UNITED STATES PATENTS 2,520,619   8/1950   Wystrach et al. ____ 260—249.6

JOHN M. FORD, Primary Examiner